US012239866B2

(12) United States Patent

Ellefskas et al.

(10) Patent No.: US 12,239,866 B2
(45) Date of Patent: Mar. 4, 2025

(54) SPRINKLER BOX FOR EMBEDDED SPRINKLER PIPE SYSTEM

(71) Applicant: Tyco Fire Products LP, Lansdale, PA (US)

(72) Inventors: Vegard Ellefskas, Blystadlia (NO); Gijsbert van Rooijen, Enschede (NL); Sean E. Cutting, West Warwick, RI (US); Alex Laprade, Lansdale, PA (US)

(73) Assignee: Tyco Fire Products LP, Cranston, RI (US)

( * ) Notice: Subject to any disclaimer, the term of this patent is extended or adjusted under 35 U.S.C. 154(b) by 413 days.

(21) Appl. No.: 17/631,140

(22) PCT Filed: Jul. 29, 2020

(86) PCT No.: PCT/IB2020/057165

§ 371 (c)(1),
(2) Date: Jan. 28, 2022

(87) PCT Pub. No.: WO2021/024107

PCT Pub. Date: Feb. 11, 2021

(65) Prior Publication Data

US 2022/0314050 A1 Oct. 6, 2022

Related U.S. Application Data

(60) Provisional application No. 62/882,004, filed on Aug. 2, 2019.

(51) Int. Cl.
*A62C 35/68* (2006.01)

(52) U.S. Cl.
CPC .................................... *A62C 35/68* (2013.01)

(58) Field of Classification Search
CPC ......... A62C 31/02; A62C 31/28; A62C 35/58; A62C 35/68
(Continued)

(56) References Cited

U.S. PATENT DOCUMENTS

| | | | | |
|---|---|---|---|---|
| 2,694,847 A | | 11/1954 | Christiansen | |
| 3,337,136 A | * | 8/1967 | Strenkert | B05B 15/60 239/209 |

(Continued)

FOREIGN PATENT DOCUMENTS

| | | | |
|---|---|---|---|
| DE | 10140942 C1 | 8/2003 | |
| DE | 10 2010 012 209 A1 | 9/2011 | |

(Continued)

OTHER PUBLICATIONS

International Search Report and Written Opinion on International Application No. PCT/IB2020/057165, mail date Nov. 17, 2020, 9 pages.

*Primary Examiner* — Steven J Ganey
(74) *Attorney, Agent, or Firm* — Foley & Lardner LLP

(57) ABSTRACT

A sprinkler assembly includes a pipe portion extending from an inlet end to an outlet end. The sprinkler assembly includes a stop coupled with the outlet end, the stop including a first wall and a second wall extending from the first wall, the first wall across the outlet end, the second wall contacting an inner surface of the pipe portion. The sprinkler assembly includes a plug coupled with the inlet end, the plug including a rim, a plug wall extending from the rim, and an end wall connected with the plug wall and opposite the rim, the plug wall contacting the inner surface of the pipe portion.

19 Claims, 6 Drawing Sheets

(58) Field of Classification Search
USPC .............................. 239/208, 209; 169/16, 37
See application file for complete search history.

(56) References Cited

U.S. PATENT DOCUMENTS

| | | | | | |
|---|---|---|---|---|---|
| 4,365,784 | A | | 12/1982 | Di Stasio | |
| 4,642,956 | A | | 2/1987 | Harbeke | |
| 6,131,822 | A | * | 10/2000 | Farmer, Jr. ............. | A62C 31/02 239/288 |
| 6,752,218 | B2 | * | 6/2004 | MacDonald, III ..... | A62C 35/68 169/37 |
| 7,624,813 | B2 | * | 12/2009 | Ma ......................... | A62C 35/68 169/37 |
| 2005/0119767 | A1 | | 6/2005 | Kiwimagi et al. | |
| 2010/0319196 | A1 | | 12/2010 | Rosenberg | |
| 2014/0091197 | A1 | | 4/2014 | Abels et al. | |
| 2016/0049064 | A1 | | 2/2016 | McNabb et al. | |
| 2016/0327293 | A1 | | 11/2016 | Grabowski et al. | |
| 2017/0025056 | A1 | | 1/2017 | Baek et al. | |

FOREIGN PATENT DOCUMENTS

| | | | |
|---|---|---|---|
| EP | 0 196 55 | A1 | 12/1980 |
| EP | 2 586 934 | A1 | 5/2013 |
| EP | 3 113 136 | | 1/2017 |
| WO | WO-2015/076680 | A1 | 5/2015 |

* cited by examiner

SPRINKLER BOX FOR EMBEDDED SPRINKLER PIPE SYSTEM

CROSS-REFERENCE TO RELATED APPLICATIONS

The present application claims the benefit of and priority to U.S. Provisional Application No. 62/882,004 titled "SPRINKLER BOX FOR EMBEDDED SPRINKLER PIPE SYSTEM," filed Aug. 2, 2019, the disclosure of which is incorporated herein by reference in its entirety.

BACKGROUND

Sprinkler systems can be provided in buildings to address fire conditions. For example, a sprinkler nozzle can be coupled with a ceiling or other structure in the building, and receive firefighting fluid, such as water, via a piping system to address the fire condition with the water.

SUMMARY

At least one aspect relates to a sprinkler assembly. The sprinkler assembly can include a pipe portion extending from an inlet end to an outlet end. The sprinkler assembly can include a stop coupled with the outlet end, the stop including a first wall and a second wall extending from the first wall, the first wall across the outlet end, the second wall contacting an inner surface of the pipe portion. The sprinkler assembly can include a plug coupled with the inlet end, the plug including a rim, a plug wall extending from the rim, and an end wall connected with the plug wall and opposite the rim, the plug wall contacting the inner surface of the pipe portion.

At least one aspect relates to a sprinkler ceiling assembly. The sprinkler ceiling assembly can include a pipe portion extending from an inlet end to an outlet end. The sprinkler ceiling assembly can include a stop coupled with the outlet end. The sprinkler ceiling assembly can include a plug coupled with the inlet end. The sprinkler ceiling assembly can include a platform extending transverse and adjacent to the stop. The sprinkler ceiling assembly can include a first layer of concrete adjacent to the pipe portion and the platform.

At least one aspect relates to a method of installing a ceiling. The method can include locating a sprinkler ceiling assembly at a target location. The method can include removing a platform supporting the sprinkler ceiling assembly from the sprinkler ceiling assembly. The method can include removing a stop from an outlet end of a pipe portion of the sprinkler ceiling assembly. The method can include removing a plug from an inlet end of the pipe portion. The method can include mounting a sprinkler fitting to the inlet end of the pipe portion. The method can include connecting an inlet end of the sprinkler fitting with a first pipe. The method can include adding a second layer of concrete to a height above the first pipe, the sprinkler fitting, and a first layer of concrete of the sprinkler ceiling assembly. The method can include connecting a sprinkler with an outlet end of the sprinkler fitting.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of sprinkler boxes for embedded sprinkler pipe systems. Embedded sprinkler pipe systems can be embedded in building structures, such as ceilings. The various concepts introduced above and discussed in greater detail below can be implemented in any of numerous ways, including in prefabricated buildings.

Embedded sprinkler pipe systems can be provided in various installations, such as pre-fabricated installations. For example, ceilings or portions thereof can be pre-fabricated remotely from a building site, and then transported to the building site to manufacture the building. To provide a sprinkler through a concrete ceiling, a cavity may be made in the concrete, at the site or during pre-fabrication. However, these operations can affect the design of the concrete ceiling, or increase the size and weight of the pre-fabricated components by requiring the sprinkler piping to be included. The concrete work on a job site or at a factory at which the pre-fabrication process is performed may be performed relatively early in the building process, before the final building structure is determined, which can make it difficult to appropriately connect sprinkler systems through the ceiling. For example, false ceilings may be installed under the concrete ceiling to create space for lighting or concealed sprinklers, but such structures may not always be accounted for during earlier stages of the process.

Systems and methods as described herein can enable greater flexibility in where the sprinkler can be located, while reducing manufacturing and transportation costs, such as by avoiding the need to include piping in the pre-fabricated components, and allowing for sprinkler systems to be connected in a manner so that modifications to the ceiling or the locations of the sprinklers can be made at the job site after the initial pre-fabrication. For example, a sprinkler assembly (e.g., sprinkler box system) can include a pipe portion extending from an inlet end to an outlet end. The sprinkler assembly can include a stop coupled with the outlet end, the stop including a first wall and a second wall extending from the first wall, the first wall across the outlet end, the second wall contacting an inner surface of the pipe portion. The sprinkler assembly can include a plug coupled with the inlet end, the plug including a rim, a plug wall extending from the rim, and an end wall connected with the plug wall and opposite the rim, the plug wall contacting the inner surface of the pipe portion. The sprinkler box, including the pipe portion, can enable various types of fittings and pipe sizes to be coupled with the sprinkler system.

Figure 1:
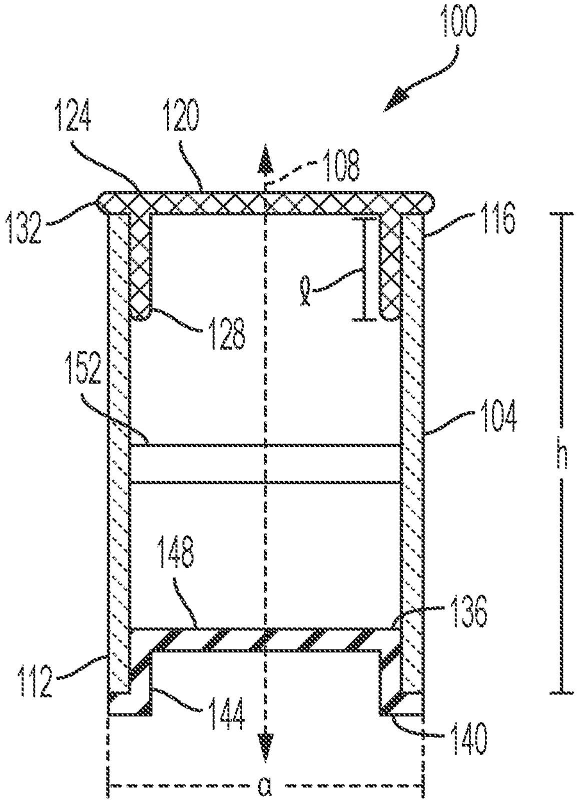
FIG. 1 is a section view of a sprinkler assembly, such as a sprinkler box assembly.

FIG. 1 depicts a schematic diagram of a sprinkler assembly 100. As will be described further herein, the sprinkler assembly 100 can be provided in a prefabricated assembly. The sprinkler assembly 100 can include a pipe portion 104. The pipe portion 104 can be used to connect a piping system with a sprinkler when the prefabricated assembly is installed. The pipe portion 104 can be made of various materials, including but not limited to plastic (e.g., PVC, CPVC) and metal materials (e.g., aluminum). The pipe portion 104 can extend along a pipe axis 108 from an inlet end 112 to an outlet end 116. The inlet end 112 can receive a pipe fitting to connect with a piping system, enabling a fluid to flow through the pipe portion 104 into a sprinkler connected with the outlet end 116.

Figure 9:
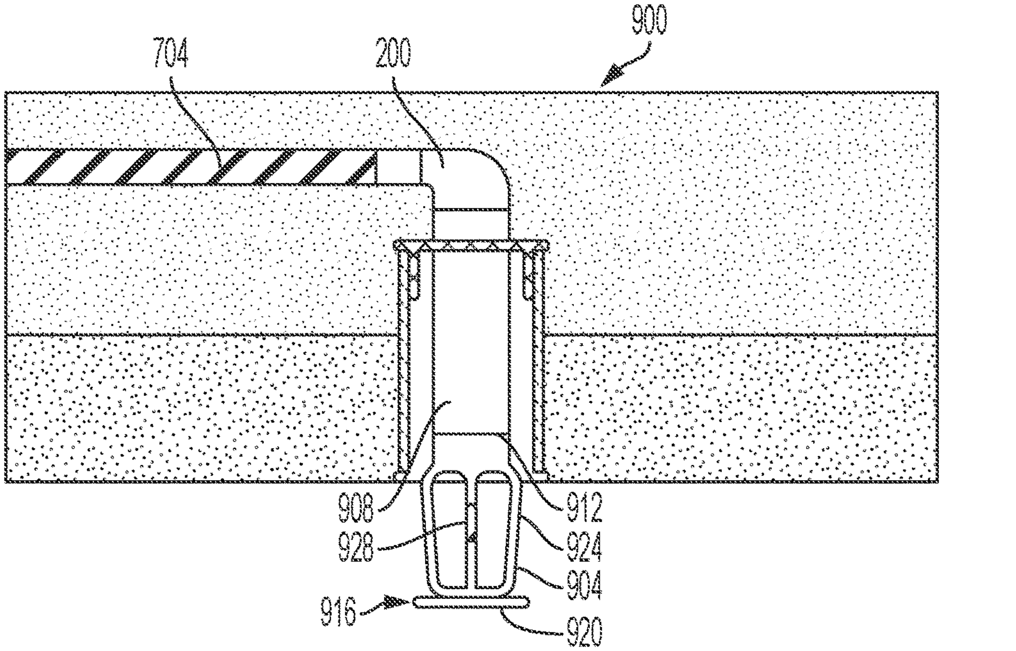
FIG. 9 is a section view of a pre-fabricated sprinkler box assembly coupled with a sprinkler.

The pipe portion 104 can be sized to fit within a layer of the prefabricated assembly, while spacing the outlet end 116 and inlet end 112 appropriately. For example, the pipe portion 104 can define a height h along the pipe axis 108 and a diameter d (e.g., an outer diameter perpendicular to the pipe axis 108). The height h can be greater than or equal to 25 millimeters (mm) and less than or equal to 300 mm. The height h can be greater than or equal to 50 mm and less than or equal to 150 mm. The height h can be greater than or equal to 60 mm and less than or equal to 120 mm. The height h can be greater than or equal to 70 mm and less than or equal to 90 mm. The height h can be 77 mm. The diameter d can be greater than or equal to 20 mm and less than or equal to 300 mm. The diameter d can be greater than or equal to 40 mm and less than or equal to 120 mm. The diameter d can be greater than or equal to 50 mm and less than or equal to 100 mm. The diameter d can be 60 mm. The diameter d can be sized to be large enough to allow a variety of components, such as fittings and pipes of various sizes, to be located within the pipe portion. For example, as depicted in FIG. 9, the pipe portion 104 may be sized to have a greater diameter than at least one pipe 908.

The sprinkler assembly 100 can include a stop 120. The stop 120 can be coupled with the outlet end 116. The stop 120 can be made of a variety of materials, including but not limited to a resilient material (e.g., rubber), or a copolymer material, such as polyoxy-methylene (POM) acetal copolymer. The stop 120 can include a first wall 124 and a second wall 128 extending from the first wall 124. The second wall 128 can extend from a portion of the first wall 124 radially inward from an edge 132 of the first wall 124. The second wall 128 can be perpendicular or substantially perpendicular (e.g., at an angle greater than or equal to 85 degrees and less than or equal to 90 degrees, greater than or equal to 88 degrees and less than or equal to 92 degrees, greater than or equal to 89 degrees and less than or equal to 91 degrees) to the first wall 124. As such, when the stop 120 is received in the outlet end 116, the edge 132 can extend over a thickness of the pipe portion 104, while the second wall 128 fits against an inner surface of the pipe portion 104. The second wall 128 can have a length 1 that is a fraction of the height h, enabling the stop 120 to form sufficient contact with an inner surface of the pipe portion 104 to protect the pipe portion 104 while retaining ease of removal of the stop 120. The fraction can be less than one half.

The sprinkler assembly 100 can include a plug 136. The plug 136 can be coupled with the inlet end 112. The plug 136 and stop 120 can cooperate to seal an interior space of the pipe portion 104, which can protect the pipe portion 104 during assembly and transport. The plug 136 can be shaped to fit within the pipe portion 104. For example, the plug 136 can include a rim 140, a plug wall 144 extending from the rim 140 from a portion of the rim 140 inward from an edge of the rim 140. The plug 136 can include an end wall 148 connected with the plug wall 144 and opposite the rim 140. The end wall 148 can be sized to fit within the pipe portion 104. The plug 136 can be made of a resilient material, such as rubber, or a copolymer material, such as polyoxy-methylene (POM) acetal copolymer.

The sprinkler assembly 100 can include at least one divider 152. The divider 152 can be positioned within the pipe portion 104 to contact an inner surface of the pipe portion 104. The divider 152 can be between the plug 136 and the stop 120 (e.g., while the sprinkler assembly 100 is provided in the prefabricated assembly). The divider 152 can reduce a rate of heat transfer from a first side of the divider 152 (e.g., a side closer to the outlet end 116) to a second side of the divider 152 (e.g., a side closer to the inlet end 112). For example, the divider 152 can reduce a volume of air in the pipe portion 104 that is adjacent to the sprinkler connected with the outlet end 116 (e.g., sprinkler 904 described with reference to FIG. 9, which may be connected using sprinkler fitting 200 described with reference to FIG. 2). This can facilitate accurate and timely triggering of the sprinkler responsive to a fire condition by reducing the rate at which heat from the fire moves into the sprinkler assembly 100 and the prefabricated assembly, including but not limited to implementations in which the concrete of the prefabricated assembly (e.g., concrete 404, 804 described with reference to FIGS. 4-8) is at a relatively cold temperature, such as near-freezing or below-freezing temperatures, or where the volume of air in the pipe portion 104 is relatively large (e.g., where the height h is as high as 300 mm). The at least one divider 152 can be formed as a washer, such as by defining a central opening that can fit around (and be sized to contact and fit against) piping that extends through the pipe portion 104, and can be moved along the pipe axis 108. The at least one divider 152 can include one or more walls that are coupled with and extend from the inner surface of the pipe portion 104. The at least one divider 152 can be made from the same material as the pipe portion 104. The at least one divider 152 can be made from a material that has a thermal conductivity less than or equal to that of the pipe portion 104. The at least one divider 152 can be made from an insulating material such that a rate of heat transfer through the at least one divider 152 is less than that of a corresponding volume of air.

Various components of the sprinkler assembly 100, including but not limited to the pipe portion 104, the stop 120, the plug 136, and the divider 152, can be made from materials with a heat transfer rate (e.g., thermal conductivity) selected to prevent such components from acting as a heat sink that may reduce the ability of a thermal trigger of the sprinkler to activate. For example, one or more such components can have a thermal conductivity greater than or equal to 0.1 W/(m-K) and less than or equal to 550 W/(m-K). The thermal conductivity can be as high as that of copper or silver.

Figure 2:
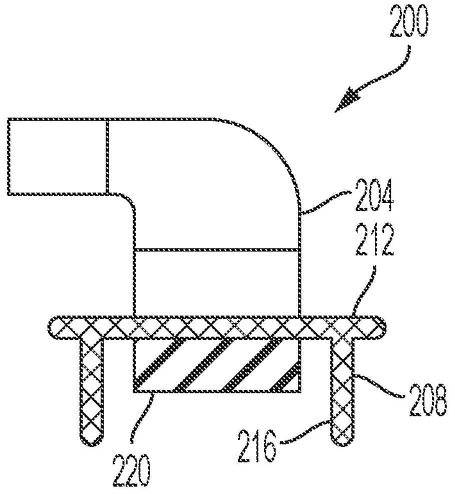
FIG. 2 is a section view of a sprinkler fitting that can connect with a sprinkler assembly.

FIG. 2 depicts a schematic diagram of a sprinkler fitting 200. The sprinkler fitting 200 can be coupled with the pipe portion 104 during installation of the pipe portion 104 and the associated sprinkler components. The sprinkler fitting 200 includes a pipe fitting 204. The pipe fitting 204 can be used to couple the pipe portion 104 with upstream piping components, so that fluid from a fluid supply can be provided through the pipe fitting 204 into the pipe portion 104 to a sprinkler in order to address a fire. The pipe fitting 204 can be coupled with the pipe portion 104 and upstream piping components in various manners, such as through the use of a click on connection (which can provide flexibility and ease of installation), a press fitting or friction fitting (e.g., by coupling stop 208 with inlet end 112 of the pipe portion 104) or threaded fittings or adhesives. The sprinkler fitting 200 can rotate in the pipe portion 104, such as to adjust an angle of the sprinkler fitting 200 relative to the pipe portion 104 and a piping system that the sprinkler fitting 200 connects the pipe portion 104 with (e.g., relative to pipe 704).

Figure 13:
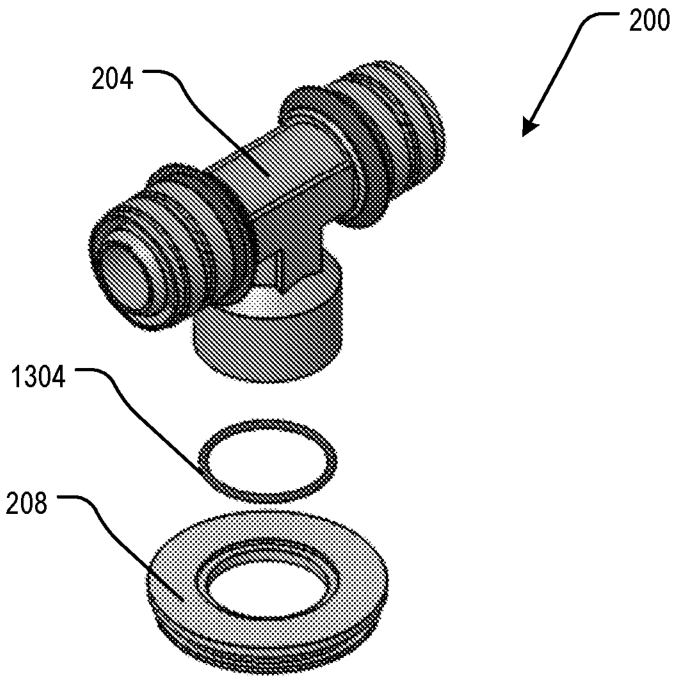
FIG. 13 is a perspective view of a sprinkler fitting including a seal.

The pipe fitting 204 can have a variety of form factors depending on the geometry of the system into which the pipe fitting 204 is to be installed, such as to connect the pipe fitting 204 with a horizontal layout of a piping system that the pipe fitting 204 is connected with to receive fluid. For example, as depicted in FIG. 2, the pipe fitting 204 can be an elbow fitting, such as a 90 degree elbow fitting. The pipe fitting 204 can be a tee joint (e.g., as depicted in FIG. 13), straight pipe section, or various other pipe fittings. The pipe fitting 204 can be made of various materials, such as plastic (e.g., PVC, CPVC) or metal (e.g., copper). The pipe fitting 204 can have a diameter corresponding to the diameter d of the pipe portion 104.

Figure 6:
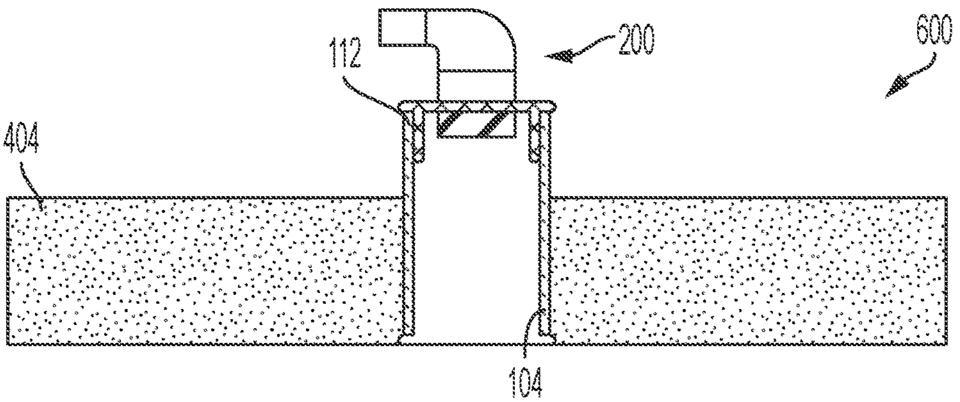
FIG. 6 is a section view of a pre-fabricated sprinkler box assembly coupled with a sprinkler fitting.

The sprinkler fitting 200 can include a stop 208. The stop 208 can be similar to the stop 120. For example, the stop 208 can be sized to connect with the inlet end 112 (e.g., as depicted in FIG. 6), having a first wall 212 and a second wall 216 extending from the first wall 212 from points radially inward from an edge of the first wall 212. The stop 208 can be made of a variety of materials (e.g., plastic, rubber, copolymers, polyoxy-methylene (POM) acetal copolymer). The stop 208 can connect with the pipe fitting 204, such as to at least partially surround an outlet end of the pipe fitting 204. As depicted in FIG. 13, the sprinkler fitting 200 can include a seal 1304 between the pipe fitting 204 and the stop 208 to facilitate proper sealing of the sprinkler fitting 200 and components coupled with the sprinkler fitting 200. The seal 1304 can be made from rubber. The seal 1304 can be an o-ring.

The sprinkler fitting 200 can include a plug 220. The plug 220 can be sized to seal an opening of the pipe fitting 204. The plug 220 can secure the stop 208 to the pipe fitting 204. The plug 220 can be made of a variety of materials (e.g., plastic, rubber, copolymers, polyoxy-methylene (POM) acetal copolymer).

Figure 3:
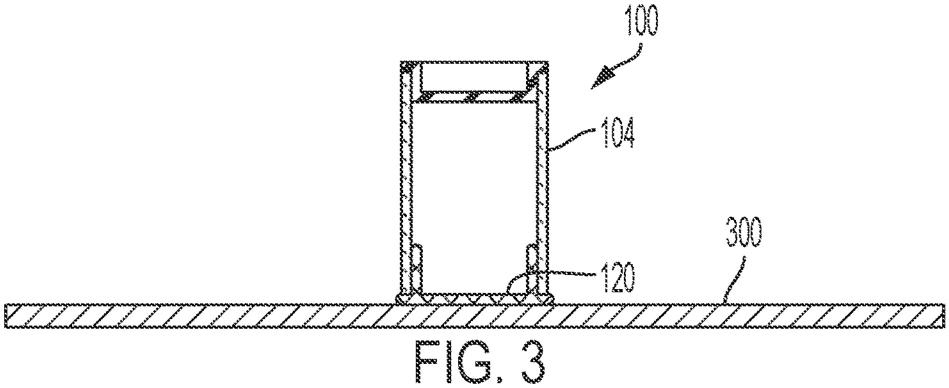
FIG. 3 is a section view of a sprinkler assembly coupled with a platform.

FIG. 3 depicts the sprinkler assembly 100 secured to a platform 300. The platform 300 can be a panel to which the sprinkler assembly 100 is secured, such as a wood, plastic, or composite panel. The sprinkler assembly 100 can be secured to the platform 300 in various manners, such as through the use of adhesives or fastening elements (e.g., clasps, screws, clamps). The sprinkler assembly 100 can be secured to the platform 300 such that the first wall 124 of the stop 120 is in contact with the platform 300, which can space the outlet end 116 of the pipe portion 104 from the platform 300 (e.g., due to the edge 132 of the stop 120 extending over the outlet end 116) while enabling the plug 136 to protect the inlet end 112 of the pipe portion 104.

Figure 4:
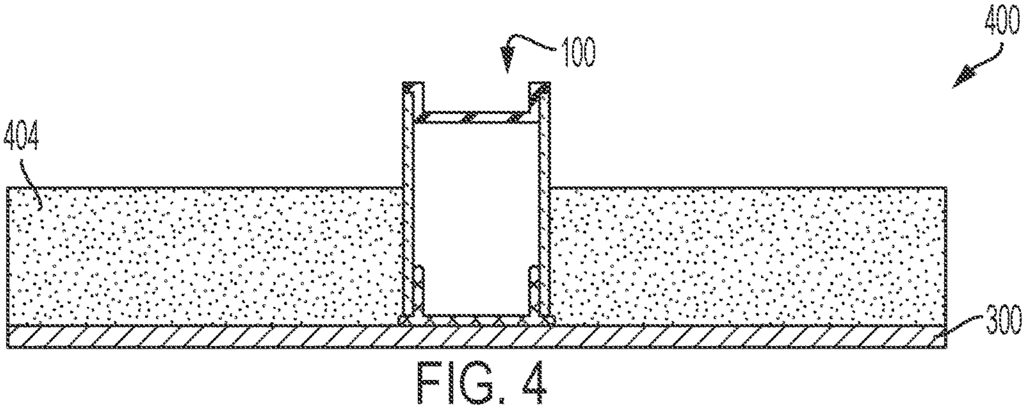
FIG. 4 is a section view of a pre-fabricated sprinkler box assembly.

FIG. 4 depicts a pre-fabricated sprinkler box assembly 400, in which concrete 404 has been provided adjacent to the sprinkler assembly 100 and platform 300. For example, the concrete 404 can be poured as a first layer of concrete onto the platform 300 and in contact with the sprinkler assembly 100. The concrete 404 and platform 300 can be made in various sizes depending on the eventual installation to be made using the sprinkler box assembly 400. The concrete 404 can be provided to a height within a threshold distance of the height h of the pipe portion 104 (e.g., a threshold distance less than or equal to 10 cm, less than or equal to 5 cm, less than or equal to 1 cm, less than or equal to 10 mm, less than or equal to 5 mm, less than or equal to 1 mm).

Figure 5:
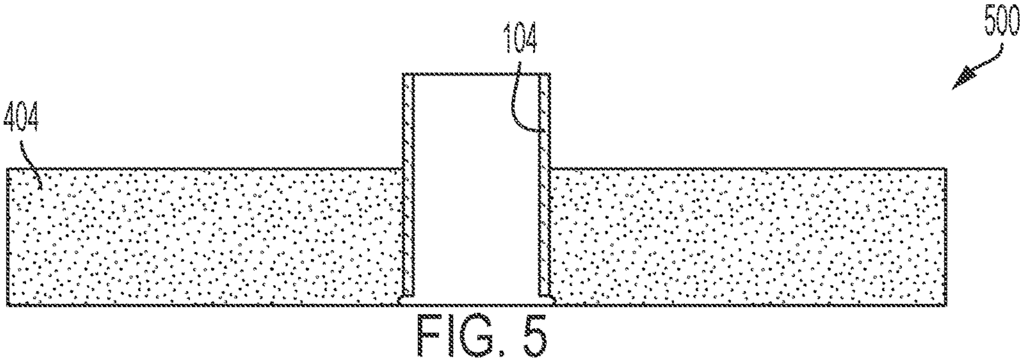
FIG. 5 is a section view of a pre-fabricated sprinkler box assembly in which support members have been removed.

FIG. 5 depicts the sprinkler box assembly 400 in a state 500 with the platform 300, stop 120, and plug 136 having been removed. For example, the platform 300, stop 120, and plug 136 can be removed at the site at which the sprinkler box assembly 400 is to be installed, such as to form a ceiling. As such, the pipe portion 104, having been protected during transportation by the stop 120, plug 136, and platform 300, can be exposed in order to be coupled with sprinkler and piping components.

FIG. 6 depicts the sprinkler box assembly 400 in a state 600 in which the sprinkler fitting 200 is coupled with the pipe portion 104. The stop 208 of the sprinkler fitting 200 can be inserted into the inlet end 112 of the pipe portion 104 to secure the sprinkler fitting 200 with the pipe portion 104. The stop 208 can be inserted to a position at which the first wall 212 contacts the inlet end 112 of the pipe portion 104. The stop 208 can seal the sprinkler fitting 200 and the pipe portion 104.

Figure 7:
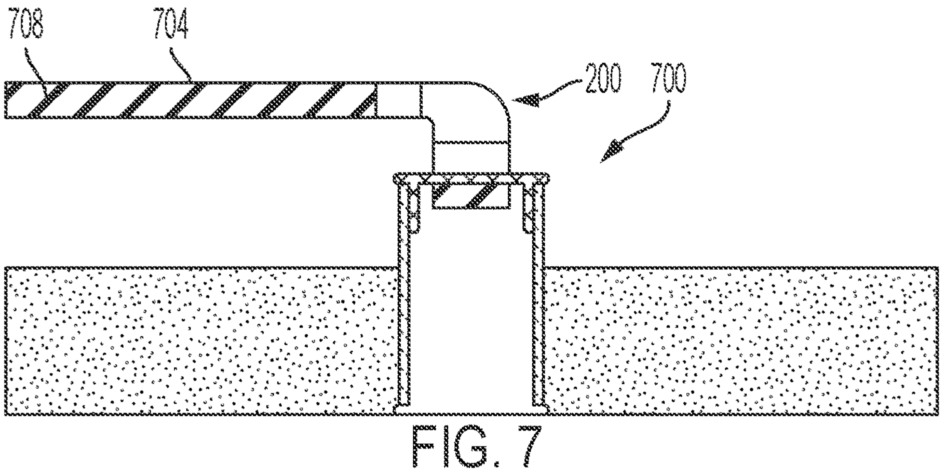
FIG. 7 is a section view of a pre-fabricated sprinkler box assembly coupled with at least one pipe.

FIG. 7 depicts the sprinkler box assembly 400 in a state 700 in which a pipe 704 is coupled with the sprinkler fitting 200. The pipe 704 can be coupled with the sprinkler fitting 200 in a variety of manners, such as press fittings or threaded fittings. The pipe 704 can connect a fluid supply (e.g., water supply) with the sprinkler fitting 200 to enable fluid to be transported through the pipe 704 into the sprinkler fitting 200.

The pipe 704 can be made from any of a variety of materials, including metal (e.g., copper, aluminum), plastic (e.g., PVC, CPVC), or combinations thereof. The pipe 704 can be a multi-layer pipe.

Pipe tape 708 can be wrapped around the pipe 704. The pipe tape 708 can be used to seal the pipe 704 and the sprinkler fitting 200, as well as to act as a resilient member around the pipe 704 to cushion the pipe 704 from impacts or strains from other materials.

Figure 8:
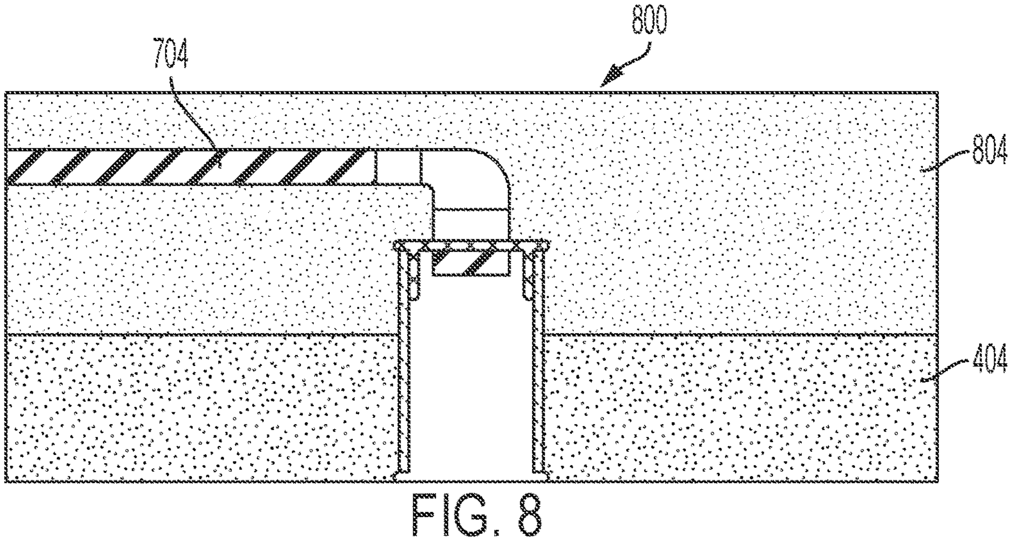
FIG. 8 is a section view of a pre-fabricated sprinkler box assembly having a second layer of concrete added.

FIG. 8 depicts the sprinkler box assembly 400 in a state 800 in which a second layer of concrete 804 is provided on top of the concrete 404 and around the pipe 704 and sprinkler fitting 200. The second layer of concrete 804 can be provided with sufficient depth to extend above the pipe 704.

FIG. 9 depicts the sprinkler box assembly 400 in a state 900 in which the plug 220 is removed from the sprinkler fitting 200, and at least one sprinkler 904 is connected with the pipe 704 via the sprinkler fitting 200. For example, at least one pipe 908 can extend at least partially through the pipe portion 104 and connect with the sprinkler fitting 200 (e.g., at an inlet end) and with the sprinkler 904 (e.g., at an outlet end). The at least one pipe 908 can be made of various sizes, shapes, and materials, and can include any of a variety of components such as tees, elbows, or other pipe lengths or junctions, enabling the sprinkler 904 to be positioned in a desired location and orientation. The at least one pipe 908 can include one or more flexible hoses. The at least one pipe 908 can connect with the sprinkler fitting 200 in various manners, such as a threaded connection. The at least one pipe 908 can have a lesser diameter than the pipe portion 104 to define an air gap between the at least one pipe 908 and the pipe portion 104. The at least one pipe 908 can include one or more various adapters to adjust a diameter of the at least one pipe 908 at which the at least one pipe 908 couples with the sprinkler 904 relative to a diameter of the sprinkler fitting 200 or the pipe 704. The at least one pipe 908 may form or be connected with various piping or system feeders that may or may not terminate in sprinklers 904.

The sprinkler 904 can operate in an open state and a closed state, and may normally operate in the closed state, such as by being biased to the closed state. The sprinkler 904 can be any of a variety of sprinklers, including but not limited to recessed, flush, institutional, or concealed sprinklers. The sprinkler 904 can switch to the open state in response to a fire condition, such as by being actuated to open when heated by a fire. The sprinkler 904 can include an inlet end 912 that connects with the at least one pipe 908, and extend from the inlet end 912 to an outlet end 916 at which a deflector 920 is disposed. The deflector 920 can include one or more tines shaped to direct flow of fluid that flows out of the sprinkler 904. The sprinkler 904 can include one or more frame arms 924 that extend from the inlet end 912 to the outlet end 916. The sprinkler 904 can include a thermal element (e.g., glass bulb, fuse) responsive to heat from the fire condition, causing the thermal element to break or otherwise fluidly couple the inlet end 912 with the outlet end 916. As such, the state 900 can be an installed state in which the sprinkler 904 is ready to operate.

Figure 10:
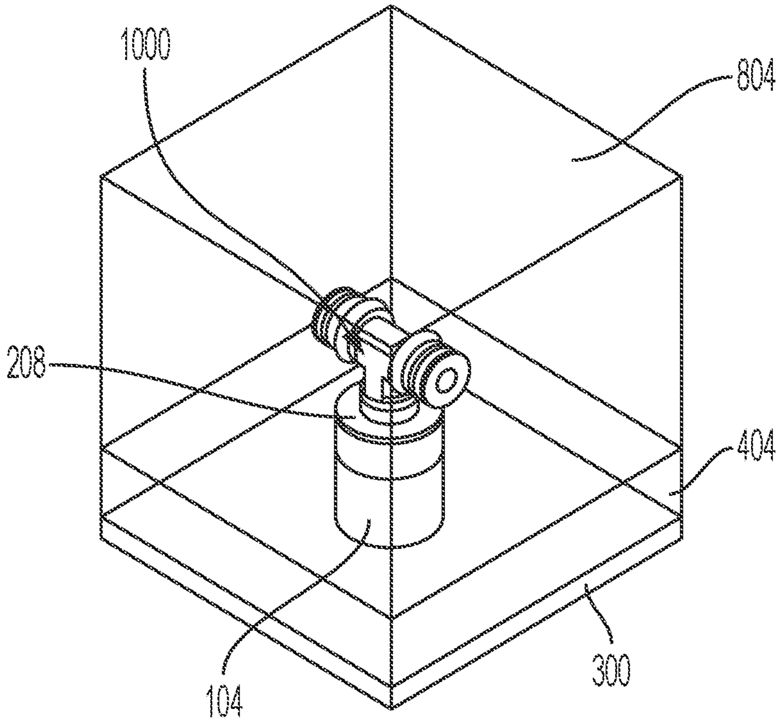
FIG. 10 is a perspective view of a sprinkler box assembly installed in a ceiling with a tee joint pipe fitting.

Referring now to FIG. 10, the sprinkler box assembly 400 is depicted as installed with the first layer of concrete 404 and the second layer of concrete 804. As depicted in FIG. 10, a tee joint pipe fitting 1000 can be connected with the stop 208. The first layer of concrete 404 can extend to a height less than a height of the pipe portion 104, which can enable greater flexibility during installation for providing the second layer of concrete 804 or adjusting or modifying the connection between the sprinkler fitting 200 relative to the pipe portion 104.

Figure 11:
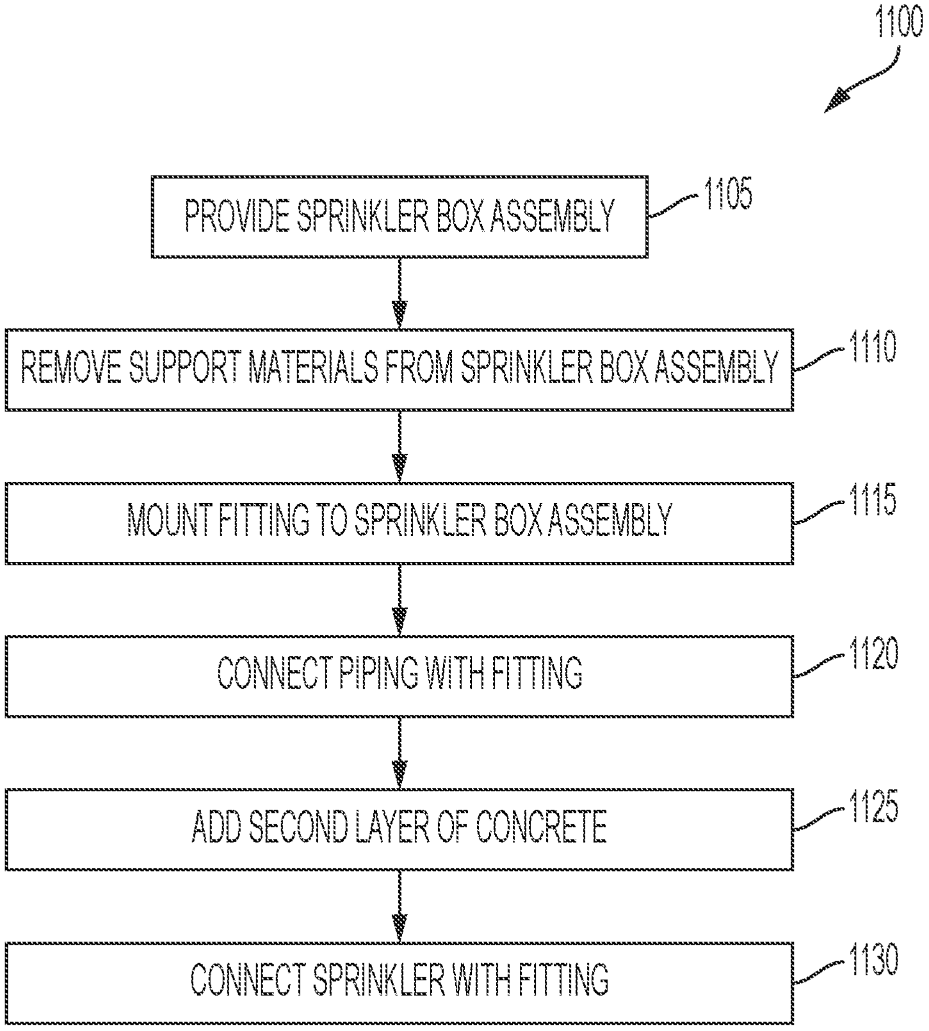
FIG. 11 is a flow diagram of a method of installing an embedded sprinkler system.

Referring now to FIG. 11, a method 1100 of installing an embedded sprinkler system is depicted. The method 1100 can be performed using various devices and systems described herein, including the sprinkler assembly 100, sprinkler fitting 200, and sprinkler box assembly 400.

At 1105, a sprinkler box assembly is provided. The sprinkler box assembly can be pre-fabricated, such as by being at least partially manufactured or assembled at a first location, and transported to a second location for installation. The sprinkler box assembly can include a sprinkler box coupled with a platform, and can include concrete (e.g., a first layer of concrete) adjacent to the sprinkler box and the platform. The sprinkler box can include a pipe portion extending from an outlet end adjacent to the platform to an inlet end, a stop at the outlet end and in contact with the platform, and a plug at the inlet end. Providing the sprinkler box assembly can include locating the sprinkler box assembly at a target location. The target location may correspond to a location at which a sprinkler is expected to be connected with a piping system via the pipe portion 104 (e.g., rather than being limited by the dimensions of the piping system).

At 1110, support materials are removed from the sprinkler box assembly. For example, the platform can be removed from under the sprinkler box. The stop and plug and be removed from the pipe portion. The support materials may be removed manually or through the use of various tools. As such, an assembly of the pipe portion and the concrete adjacent to the pipe portion can be provided in a manner ready for installation, such as to install a ceiling of a building and to connect the pipe portion with a fluid supply and with sprinkler components.

At 1115, a sprinkler fitting is mounted to the sprinkler box assembly. The sprinkler fitting can include a pipe fitting that can be used to connect with a piping system to provide fluid to a sprinkler, and a stop that can be positioned in the pipe portion to secure the sprinkler fitting to the pipe portion. Mounting the sprinkler fitting to the sprinkler box assembly can include positioning the stop in the pipe portion, such as to contact the stop and the pipe portion. The sprinkler fitting can include a plug that can plug an outlet end of the pipe fitting.

At 1120, one or more pipes can be connected with the sprinkler fitting. A pipe can be connected with an inlet end of the pipe fitting. The pipe can be made of any of a variety of materials, such as metal, plastic, or combinations thereof. The pipe can be a multi-layer pipe. The pipe can be connected with the sprinkler fitting by various processes, such as through a press fitting or threaded fitting. Pipe tape or pipe adhesives can be provided in the connection between the pipe and the pipe fitting of the sprinkler fitting to secure or seal the pipe and the pipe fitting. The pipe can be at least partially covered by pipe tape to provide sealing or resilience to the pipe.

At 1125, a second layer of concrete can be added to the sprinkler box assembly. For example, a concrete to form a second layer of concrete can be poured onto the first layer of concrete, the pipe, and sprinkler fitting, and the sprinkler box. The concrete can be added to form the second layer to a height above the pipe and sprinkler fitting. The concrete can be added subsequent to connecting the pipe with the sprinkler fitting.

At 1130, a sprinkler is connected with the sprinkler fitting. The sprinkler can be connected with the sprinkler fitting via one or more pipes. For example, an inlet end of a pipe section can be connected with the outlet end of the pipe fitting, so that the pipe section at least partially extends through the pipe portion of the sprinkler box. A length of the pipe section can be selected so that an outlet end of the pipe section is located within the pipe portion (e.g., above the outlet end of the pipe portion), which can facilitate located an inlet end of the sprinkler within the pipe portion (e.g., within the ceiling defined by the first layer of concrete). Various pipe components, such as pipe sections, bends (e.g., elbows of various angles), or junctions, may be provided between the sprinkler and the sprinkler fitting to position and orient the sprinkler in a desired position and orientation.

Figure 12:
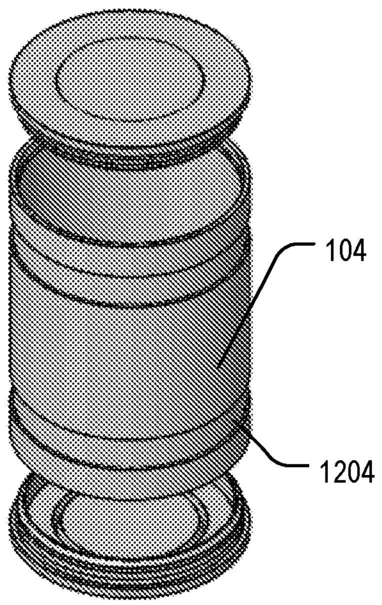
FIG. 12 is a perspective view of a sprinkler assembly in which a pipe portion includes grooves.

FIG. 12 depicts an example of the sprinkler assembly 100 in which the pipe portion 104 defines at least one groove 1204. The grooves 1204 can extend at least partially circumferentially around an exterior of the pipe portion 104 and into the pipe portion 104 (or outward from the pipe portion 104). The grooves 1204 can enable the pipe portion 104 to form a mechanical connection with the concrete (e.g., concrete 404, 804) of the prefabricated assembly to strengthen the coupling of the pipe portion 104 with the concrete. The grooves 1204 can include at least a first groove 1204 and a second groove 1204 that may be closer to respective ends of the pipe portion 104 than a center of the pipe portion 104 (e.g., a central plane perpendicular to pipe axis 108).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A sprinkler assembly, comprising:

a pipe portion extending from an inlet end to an outlet end;

a stop coupled with the outlet end, the stop including a first wall and a second wall extending from the first wall, the first wall across the outlet end, the second wall contacting an inner surface of the pipe portion;

at least one divider coupled with the pipe portion, the at least one divider made from an insulating material having a thermal conductivity less than a thermal conductivity of the pipe portion and such that a rate of heat transfer through the at least one divider is less than that of a corresponding volume of air; and a plug coupled with the inlet end, the plug including a rim, a plug wall extending from the rim, and an end wall connected with the plug wall and opposite the rim, the plug wall contacting the inner surface of the pipe portion.

2. The sprinkler assembly of claim 1, comprising:

the pipe portion extends along a pipe axis from the inlet end to the outlet end; and the second wall of the stop extends from a portion of the first wall radially inward from an edge of the first wall relative to the pipe axis.

3. The sprinkler assembly of claim 1, comprising:

the second wall of the stop has a length that is less than one half of a height of the pipe portion from the inlet end to the outlet end.

4. The sprinkler assembly of claim 1, comprising:

the end wall of the plug is spaced from the inlet end of the pipe portion.

5. The sprinkler assembly of claim 1, comprising:

the pipe portion has a diameter greater than or equal to 40 mm and less than or equal to 80 mm.

6. The sprinkler assembly of claim 1, comprising:

the pipe portion is made of aluminum; and the stop and the plug are each made of polyoxymethylene (POM) acetal copolymer.

7. The sprinkler assembly of claim 1, comprising:

at least a portion of the sprinkler assembly has a thermal conductivity greater than or equal to 0.1 W/m-K and less than or equal to 550 W/m-K.

8. A sprinkler assembly, comprising:

a pipe portion extending from an inlet end to an outlet end;

a stop coupled with the outlet end, the stop including a first wall and a second wall extending from the first wall, the first wall across the outlet end, the second wall contacting an inner surface of the pipe portion;

a plug coupled with the inlet end, the plug including a rim, a plug wall extending from the rim, and an end wall connected with the plug wall and opposite the rim, the plug wall contacting the inner surface of the pipe portion; and a sprinkler fitting, comprising:

a pipe fitting;

a stop connected with the pipe fitting and the inlet end of the pipe portion;

a seal between the pipe fitting and the stop; and a plug that seals an opening of the pipe fitting.

9. A sprinkler ceiling assembly, comprising:

a pipe portion extending from an inlet end to an outlet end;

a stop coupled with the outlet end;

at least one divider coupled with the pipe portion, the at least one divider made from an insulating material having a thermal conductivity less than a thermal conductivity of the pipe portion and such that a rate of heat transfer through the at least one divider is less than that of a corresponding volume of air;

a plug coupled with the inlet end;

a platform extending transverse and adjacent to the stop; and a first layer of concrete adjacent to the pipe portion and the platform.

10. The sprinkler ceiling assembly of claim 9, comprising:

the stop includes a first wall and a second wall extending from the first wall, the first wall across the outlet end and in contact with the platform, the second wall in contact with an inner surface of the pipe portion.

11. The sprinkler ceiling assembly of claim 9, comprising:

the first layer of concrete extends from the platform to a height less than a height of the pipe portion.

12. The sprinkler ceiling assembly of claim 9, comprising:

the plug includes a rim, a plug wall extending from the rim, and an end wall connected with the plug wall and opposite the rim, the plug wall contacting the inner surface of the pipe portion, the rim extending over the inlet end of the pipe portion.

13. The sprinkler ceiling assembly of claim 9, comprising:

at least a portion of the sprinkler ceiling assembly has a thermal conductivity greater than or equal to 0.1 W/m-K and less than or equal to 550 W/m-K.

14. The sprinkler ceiling assembly of claim 9, comprising:

the second wall of the stop has a length that is less than one half of a height of the pipe portion from the inlet end to the outlet end.

15. A method of installing an embedded sprinkler system, comprising:

locating a sprinkler ceiling assembly at a target location;

removing a platform supporting the sprinkler ceiling assembly from the sprinkler ceiling assembly;

removing a stop from an outlet end of a pipe portion of the sprinkler ceiling assembly;

removing a plug from an inlet end of the pipe portion;

mounting a sprinkler fitting to the inlet end of the pipe portion;

connecting an inlet end of the sprinkler fitting with a first pipe;

adding a second layer of concrete to a height above the first pipe, the sprinkler fitting, and a first layer of concrete of the sprinkler ceiling assembly; and connecting a sprinkler with an outlet end of the sprinkler fitting.

16. The method of claim 15, comprising:

connecting the first pipe with a fluid supply.

17. The method of claim 15, comprising:

connecting at least one second pipe between the sprinkler and the outlet end of the sprinkler fitting.

18. The method of claim 15, comprising:

removing a plug in outlet end of the sprinkler fitting;

connecting at least one second pipe with outlet end of the sprinkler fitting; and connecting the sprinkler with the at least one second pipe.

19. The method of claim 15, comprising:

mounting a sprinkler fitting to the inlet end of the pipe portion by positioning a stop of the sprinkler fitting in the inlet end of the pipe portion.

* * * * *